United States Patent [19]

Groff

[11] 4,099,796
[45] Jul. 11, 1978

[54] VIBRATION DAMPED SHOE ASSEMBLY

[75] Inventor: Eugene R. Groff, Chillicothe, Ill.

[73] Assignee: Caterpillar Tractor Co., Peoria, Ill.

[21] Appl. No.: 746,567

[22] Filed: Dec. 1, 1976

[51] Int. Cl.² ............................................. B62D 55/28
[52] U.S. Cl. ......................................... 305/46; 305/54
[58] Field of Search ....................... 305/46, 54, 39, 55; 74/247

[56] References Cited

U.S. PATENT DOCUMENTS

| 1,765,580 | 6/1930 | Haggart | 305/46 |
| 3,071,217 | 1/1963 | Gould | 139/34 |

FOREIGN PATENT DOCUMENTS 289,507  5/1967  Australia ................................. 305/46

Primary Examiner—Robert B. Reeves
Assistant Examiner—John P. Shannon
Attorney, Agent, or Firm—John L. James

[57] ABSTRACT

A shoe assembly of a continuous track of a crawler type vehicle has a cover plate and a shoe. The cover plate is of a configuration sufficient for spacing first and second end portions of the cover plate a preselected distance from the shoe in the installed position. Viscoelastic material is positioned between the shoe and the first and second end portions of the cover plate. An elevated seat of one of a middle portion of the cover plate or shoe contacts a middle portion of the other of said cover plate or shoe and maintains said preselected distance.

10 Claims, 5 Drawing Figures

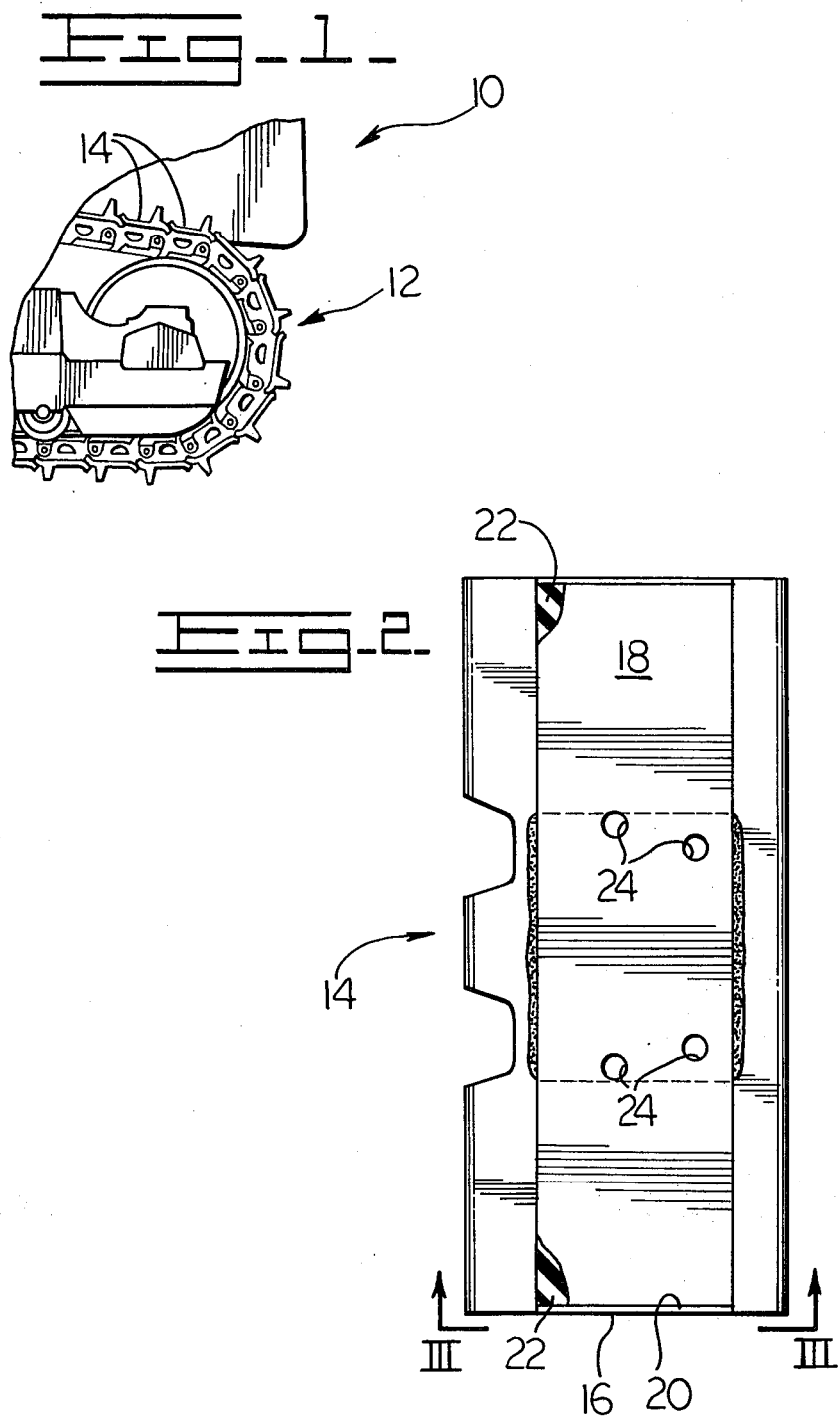

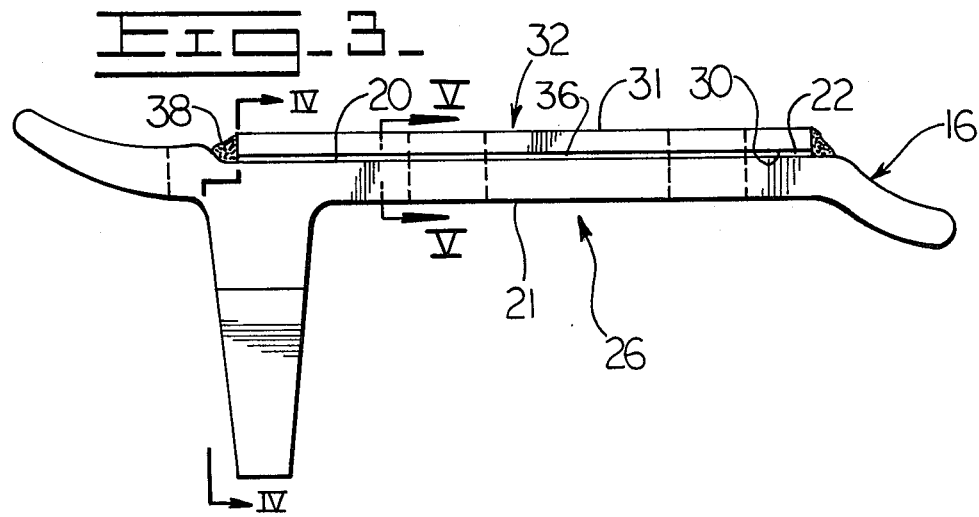
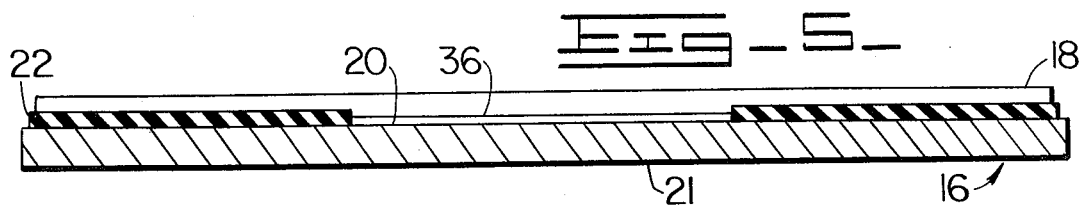
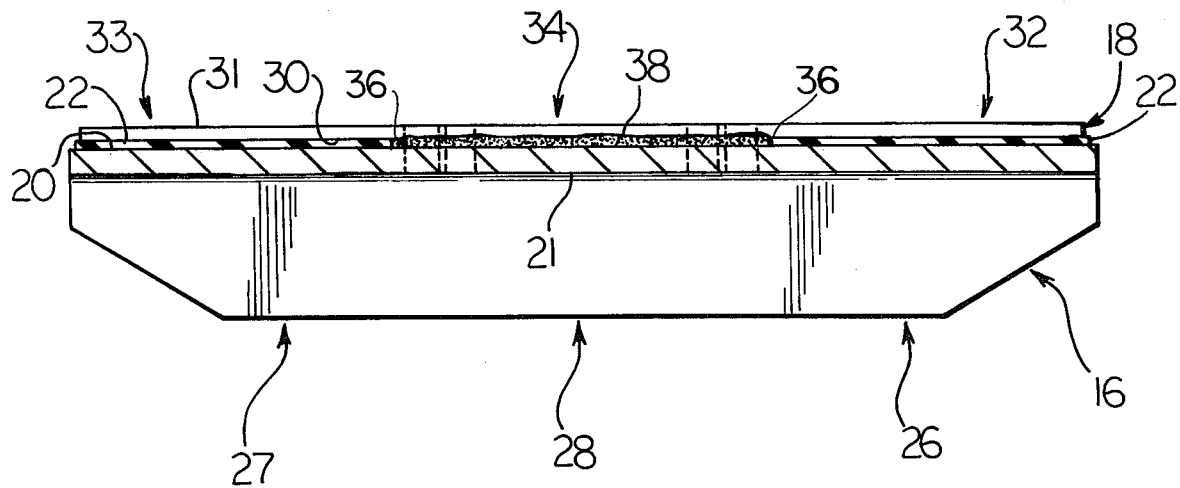

VIBRATION DAMPED SHOE ASSEMBLY

BACKGROUND OF THE INVENTION

In the operation of crawler type vehicles, the noise level emitted from the rotating track is often objectionable. This is particularly true where such vehicles are used in construction adjacent an apartment complex, office building, or other locations where a large number of people could be disturbed by the noise.

This noise is emitted from driving forces being subjected onto the track and from impacts by objects on the track. One of the principal sites of noise emission is from the shoes of the track. Sound waves readily travel outwardly from the relatively broad surfaces of the shoes. Further, the shoes are of a configuration which sometimes reaches resonance frequency which functions to increase the objectionable noise.

The present invention is directed to overcoming one or more of the problems as set forth above.

According to the present invention, the shoe assembly has a shoe and a cover plate generally covering one surface of the shoe. The shoe and cover plate each have respective first and second end portions and a middle portion. A seat is provided on the middle portion of one of the cover plate and shoe. The seat is of a configuration sufficient for mating with the middle portion of the other of said cover plate shoe with viscoelastic material positioned between the first and second end portions of the shoe and cover plate.

BRIEF DESCRIPTION OF THE DRAWINGS

FIG. 1 is a diagrammatic view of a portion of a crawler type vehicle having the shoe assembly of this invention;

FIG. 2 is a diagrammatic top view of the shoe assembly of this invention;

FIG. 3 is a diagrammatic end view of the shoe assembly; and

FIG. 4 is a diagrammatic sectional view along the width of the shoe assembly taken along line IV—IV of FIG. 3; and FIG. 5 is a diagrammatic sectional view taken along line V—V of FIG. 3.

DETAILED DESCRIPTION OF THE INVENTION

Referring to FIG. 1, a crawler type vehicle 10, for example a crawler type tractor, has a continuous track 12 formed of a plurality of shoe assemblies 14.

Referring to FIG. 2, each shoe assembly 14 has a shoe 16 and a cover plate 18 substantially covering a first surface 20 of the shoe 16. Viscoelastic material 22 is positioned between the first surface 20 of the shoe 16 and the cover plate 18. Openings 24 are formed through the shoe 16 and cover plate 18 for receiving a bolt therethrough for connecting the shoe assemblies together to form the continuous track 12.

Referring to FIGS. 3 and 4, the shoe has first and second opposed surfaces 20,21, first and second end portions 26,27, and a middle portion 28. The cover plate 18 has first and second opposed surfaces 30,31, first and second end portions 32,33, and a middle portion 34.

The cover plate 18 of this invention has a seat 36 positioned at the middle portion 34 thereof. The seat 36 extends outwardly a preselected distance from the first surface of the cover plate 18 (FIG. 5). The seat 36 is of a configuration sufficient for mating with the middle portion 28 of the first surface 20 of the shoe 16 in the installed position of the cover plate 18 on the shoe 16. In this position and with this configuration, the first and second end portions 32,33 of the cover plate 18 are each spaced a preselected distance from the respective first and second end portions 26,27 of the shoe 16. The viscoelastic material 22 is positioned in the space between the end portions of the shoe 16 and cover plate 18. It should be noted that the seat 36 can be formed on the shoe without departing from this invention.

As can be seen from a study of the drawings, the first and second end portions 26,27 and 32,33 of the shoe 16 and cover plate 18 are positioned for forming respective first and second edges of the continuous track 12 in the assembled condition. The cover plate 18 is fixed to the shoe 14 by welding 38. However, it should be noted that only a portion of the cover plate 18 is welded to the shoe 16 thereby permitting other portions of the cover plate 18 and shoe 16 to move relative one to the other for transmitting vibration forces into the intervening viscoelastic material 22 where they are dissipated as shearing forces in said material 22. Preferably, only the middle portion 28 of the shoe 16 is welded to the middle portion 34 of the cover plate 18. The first and second end portions 26,27 and 32,33, and middle portion 28 and seat 36 of the shoe 16 and cover plate 18 are preferably each of a generally planar configuration and the end portions and middle portions of the shoe 16 and cover plates 18 each comprise about one-third of the total width of the respective shoe 16 or cover plate 18.

By the term viscoelastic material as used herein, it is meant material that is capable of being bonded to steel and which has the properties of being viscous and elastic. For example, the material is of the type identified as Dow-Corning DC 271 which is a silicon base material manufactured by the Dow-Corning Corporation of Saginaw Road, Midland, Mich. 48640 or Aniphon AB HT40 which is a thermoplastic viscoelastic material manufactured by the Specialty Composites Corp. of Delaware Industrial Park, Newark, Del. 19711.

The spacing between the end portions 26,27 and 32,33 of the respective shoe 16 and cover plate 18 is preferably a distance in the range of about 0.01 to about 0.12 inches as installed. Therefore, the thickness of the bonded viscoelastic material 22 is likewise maintained within the above cited range. Spacing and viscoelastic material thickness greater than 0.13 inches is undesirable because at greater thicknesses, energy of a desirable magnitude will not be transferred to heat and spacing and viscoelastic material thickness less than 0.01 inches is undesirable because shoes constructed by hot rolling would be of sufficient roughness to permit metal-to-metal contact with portions of the cover plate.

By so constructing the shoe assembly 14, deflection forces on the shoe are transmitted into the viscoelastic material 22 where they are changed to shear forces and are dissipated and are absorbed by the viscoelastic material 22. The construction of the seat 36 which coacts with the middle portion 28 of the shoe allows for the extreme tightening forces that are necessary in assembling a continuous track 12 and provides a retaining wall for the inner edges of the viscoelastic material 22. Further, the construction also permits the reduction of viscoelastic material 22 utilized by limiting its use to the area of greatest vibration, i.e., the outer edges of the shoe 16, thereby avoiding waste.

Other aspects, objects, and advantages of this invention can be obtained from a study of the drawings, the disclosure, and the appended claims.

The embodiments of the invention in which an exclusive property or privilege is claimed are defined as follows:

1. In a shoe assembly having a shoe having opposed first and second surfaces, a cover plate generally covering the shoe, and viscoelastic material positioned between the shoe and the cover plate, the improvement comprising:
   said shoe and cover plate each having first and second end portions and a middle portion and including:
   a seat on the middle portion of one of the cover plate and shoe, said seat contacting the middle portion of the other of said cover plate and shoe with the first and second end portions of the cover plate each spaced a preselected distance from the respective first and second end portions of the shoe and having viscoelastic material between the first and second end portions of the shoe and cover plate in the installed position of the cover plate on the shoe.

2. A shoe assembly, as set forth in claim 1, wherein the first and second end portions of the shoe and seat are oriented for forming respective first and second edge portions of a continuous track.

3. A shoe assembly, as set forth in claim 1, including:
   openings through the middle portion of the shoe and the cover plate and being aligned relative one to the other for receiving a bolt for connecting the cover plate to the shoe.

4. A shoe assembly, as set forth in claim 1, wherein the first and second end portions of the cover plate are spaced from the first and second end portions of the shoe a preselected distance in the range of about 0.01 to about 0.13 inches in the installed position.

5. A shoe assembly, as set forth in claim 1, wherein the first and second end portions and the middle portion and seat of the respective shoe and cover plate are of a generally planar configuration.

6. A shoe assembly, as set forth in claim 1, wherein the first and second end portions and middle portion of the shoe and cover plate each comprise about one-third of the total width of said shoe and cover plate.

7. A shoe assembly, as set forth in claim 1, including:
   means for connecting a plurality of said shoe assemblies one to the other to form a continuous track.

8. A shoe assembly, as set forth in claim 1, wherein said shoe assembly is a portion of a crawler type vehicle.

9. In a shoe assembly having a shoe having opposed first and second surfaces, a cover plate generally covering the shoe, and viscoelastic material positioned between the shoe and the cover plate, the improvement comprising:
   said shoe and cover plate each having first and second end portions and a middle portion and including:
   a seat on the middle portion of one of the cover plate and shoe, said seat being of a configuration sufficient for mating with the middle portion of the other of said cover plate and shoe with the first and second end portions of the cover plate each spaced a preselected distance from the respective first and second end portions of the shoe and having viscoelastic material between the first and second end portions of the shoe and cover plate in the installed position of the coverplate on the shoe, only a portion of the periphery of the cover plate being welded to the shoe.

10. A shoe assembly, as set forth in claim 9, wherein only the middle portion of the shoe is welded to the cover plate.

* * * * *